United States Patent Office

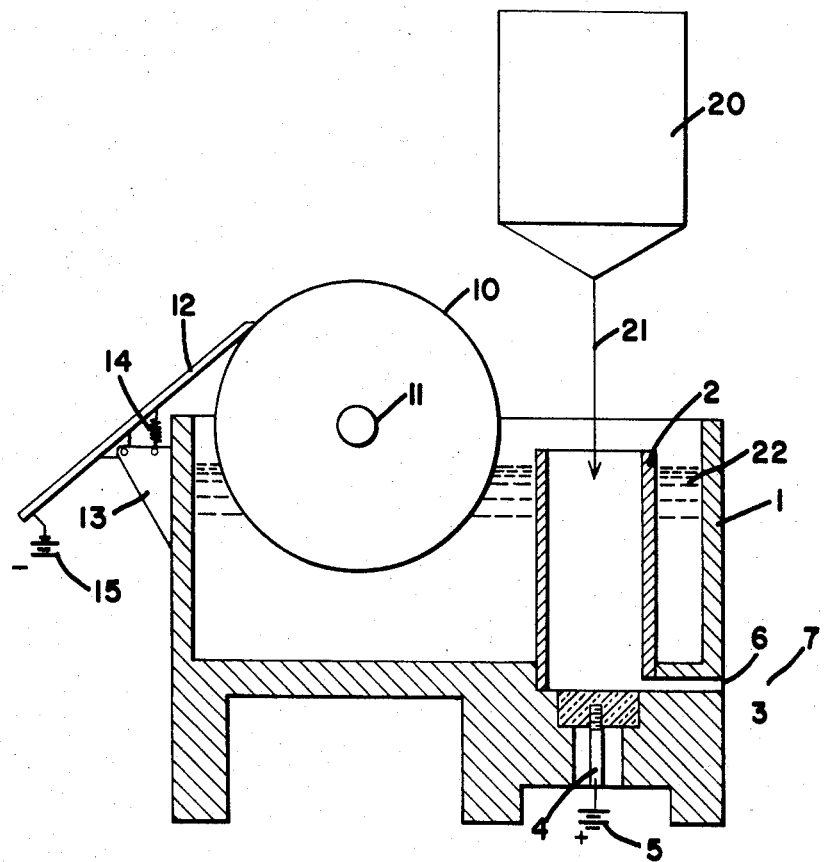

3,778,360
Patented Dec. 11, 1973

3,778,360
PROCESS FOR THE ELECTROLYTIC RECOVERY
OF COPPER FROM ITS ORES
John Gordy, 1011 Dennis Crescent E.,
Richmond, British Columbia, Canada
Continuation-in-part of abandoned application Ser. No.
558,419, June 17, 1966. This application Feb. 25, 1970,
Ser. No. 14,172
Int. Cl. C09d 1/00; C22d 1/16
U.S. Cl. 204—107                             12 Claims

ABSTRACT OF THE DISCLOSURE

This invention relates to a method of solubilizing copper metal from copper ores, such as copper sulfide ores comprising the step of electrolyzing a slurry of the finely ground ore, in the presence of a catalyst, in the anodic chamber of an electrolytic cell, said catalyst comprising an ion complex of cuprous chloride in aqueous hydrogen chloride and plating coper metal on the cathode. An ion-permeable membrane is used to separate the anodic compartment containing ore slurry from the cathodic compartment.

RELATED CASE

This is a continuation-in-part application of my application Ser. No. 558,419 filed on the June 17, 1966, and now abandoned.

DISCLOSURE

The present invention relates to the recovery of copper from ores, and more specifically to a novel electrolytic ore leaching method and apparatus which may be used to recover copper from its ores or ore concentrates.

Numerous methods have been described in the prior art for recovering metals from their native ores. Prior workers have shown that mineral ores may be broken down and the valuable constituents therein recovered by methods involving techniques such as thermal or electrolytic oxidation or reduction, chemical extraction, flotation and so forth. These procedures have been used successfully when the ore being processed possesses relatively few metallic values to be recovered and is of relatively uniform chemical composition. However, there is a need for a more efficient method, particularly for use with complex ores or mineral concentrates. Thus it is an object of the present invention to provide an improved electrolytic copper ore treatment method and apparatus.

The present invention therefore provides a method of solubilizing copper metal from its ores comprising the step of electrolyzing a slurry of the finely ground ore, in the presence of a catalyst, in the anodic chamber of an electrolytic cell, said catalyst comprising an ion complex of a copper halide in aqueous hydrogen halide, said hydrogen halide being present in sufficient concentration to induce the complex formation and dissolve copper halide, and depositing copper metal in the cathode compartment, such as by plating on the cathode. The same halide will normally be employed for both the copper halide and the hydrogen halide.

In a preferred embodiment the present invention provides such a method wherein the metal halide is a cuprous halide. The halide should be the chloride, bromide or iodide. The chloride will normally be preferred, particularly since it is the cheapest halide. The concentration of hydrogen halide in the electrolytic solution will normally be at least 3 N in order to ensure proper complexing solubilization of the cuprous chloride. There is no well defined upper limit for the concentration of the hydrogen halide, however, the economics dictate that the concentration be held as low as possible consistent with proper solubilization of the copper halide, and ion complex formation.

In another embodiment the present invention provides such methods wherein said electrolysis treatment comprises placing said cuprous halide complex solution in an anodic zone defined by an anode and a membrane permeable to the passage of copper ions, contacting the membrane of the anodic zone with the electrolyte of a cathodic zone defined by a cathode, and an electrolytic solution comprising a solution of the corresponding hydrogen halide, and applying a potential voltage across the electrolytic cell. Again the halide will normally comprise the chloride. The methods are especially applicable to the copper oxide and particularly the copper sulfide containing ores.

Accordingly, a further aspect of the present invention provides such methods for the treatment of sulfide ores and comprising oxidizing copper sulfide to form copper ions, passing said copper through said ion-permeable chamber and recovering metallic copper on the cathode.

In certain preferred embodiments the present invention provides such methods wherein at least part of the transfer of dissolved copper from the anode compartment to the cathode compartment is effected by transfer of anode solution containing dissolved copper.

The present invention further provides an apparatus for the anodic treatment of copper containing ores which comprises an anodic chamber adapted to receive copper halide complex and ore to be treated, a cathodic chamber and an ion-permeable separating wall, means for supplying finely ground ore and copper halide complex to the anode compartment, means for removing copper metal from the cathode compartment, means for withdrawing pregnant anode solution containing dissolved copper from the anode compartment, and means for supplying said solute to the cathode compartment.

In a preferred embodiment the present invention provides such an apparatus further comprising means for removing solids from the pregnant anode solution before supplying said solution to the cathode compartment.

In another aspect, the present invention relates to electrolytic solutions as described above, which are suitable for extraction of copper metal from its ores.

These and further objects of the present invention will became readily apparent to those skilled in the art from the following detailed description and drawing. The drawing represents a schematic cross-sectional view of an electrolytic cell apparatus which may be used in the practice of the present invention.

A more detailed understanding of my present invention may be obtained by referring to the drawing which represents a schematic sectional diagram of an electrolytic apparatus which may be effectively used in the practice of my present invention. The apparatus consists of a tank 1 which is fabricated from an acid resistant material, such as fiber glass reinforced plastic. Located in the tank 1 is an anodic chamber which is composed of ion permeable porous ceramic. The anodic chamber 2 is located over an anode member 3 which is preferably fabricated from carbon. The anode 3 is connected by means of electrical conduit 4 to a source of direct current 5 generally indicated as the anode bearing a plus charge.

The anodic chamber 2 is provided with an outlet 6 which may be used to expel spent solutions and slurries in the direction indicated by the arrow 7.

Also located in the tank 1 is a cylindrical cathode member 10. Cathode member 10 is fabricated from an electroconductive substance such as copper. The cylinder 10 rotates on axis 11 and is in contact with scraper member 12 which serves to remove accumulated material from the surface thereof. The scraper member 12 is pivotally mounted to the tank 1 by means of mounting 13. Furthermore, the scraper member 12 is maintained in constant frictional engagement with the cathode wheel 10 by means of spring 14. The scraper member 12 is provided with an electrical connection 15 which is attached to a source of direct current and bears a negative polarity as indicated by the minus sign.

Located above anode chamber 2 is storage tank 20 which provides a source of mineral ore slurry and cuprous halide complex solution. The ore slurry and solution enters the anode chamber 2 by means of conduit 21. The tank 1 when in operation is filled with electrolyte 22. This electrolyte preferably comprises a dilute solution of hydrogen halide.

In operation of the electrolytic device shown in the drawing a mixture of cuprous halide complex solution and ore material is placed in anodic chamber 2. This slurry of ore and cuprous halide complex solution is admitted to the anodic chamber 2 by means of conduit 21 leading from tank 20. The slurry may be agitated by conventional means, such as an air bubbler (not shown). The tank 1 is then filled with an electrolyte which preferably comprises a dilute aqueous solution of hydrochloric acid. A potential derived from a direct current source of electricity is placed across anode connection 5 and the cathode connection 15. Preferably this potential will amount to from about 6 to 12 volts. The cathode cylinder 10 is then set in revolving motion (by means not shown) whereupon metal (in its reduced form) deposits upon the surface of the cathode cylinder 10. The metal, as it is deposited upon the rotating cylinder 10, is scraped from the surface thereof by means of scraping member 12. This material may then be advantageously collected in a container located below scraper member 12, but not shown herein.

The copper ores treated in accordance with the practice of my present invention may comprise sulfide or oxide ores, which may contain in addition to copper, considerable amounts of iron, precious metals such as gold, silver and platinum. Typically, the ores treated in accordance with my present invention may be cubanite ($CuFe_2S_4$), chalmersite ($CuFe_2S_3$), stannite

chalcocite ($Cu_2S$), chalcopyrite ($CuFeS_2$), covellite ($CuS$), and bornite ($Cu_3FeS_4$). In addition to these ores, the present invention may be used to treat placer mining concentrates.

The ion permeable membrane may be fabricated from any conventional material such as ceramic. The present anodic electrolysis is preferably carried using a direct current voltage which may vary from about 6 to 12 volts. Preferable current densities used in my process vary from about 8 to 10 amperes per square foot of anode area.

The cuprous halide complex used in the practice of a preferred form of my present invention may be obtained by combining a cuprous chloride, with an aqueous solution of hydrochloric acid. Preferably, the cuprous chloride solution used in my invention contains from about 0.1 to 0.6 mole of cuprous chloride salt and from about 3 to 6 moles of hydrogen chloride per liter of aqueous anode feed solution. It is believed that the present cuprous chloride complex possess the general formula

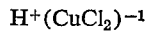

Copper metal is preferentially deposited by the electrolytic current from the cathode solution onto the cathode plate. This may deposit in the form of a shriny plate or sponge or in the form of a powder or granular material which may settle to the bottom of the cathode compartment.

Typically when a copper sulfide ore is treated in the apparatus shown in the figure the copper sulfide is oxidized in the anode chamber to provide copper ions which migrate from the anodic chamber to the cathode where it is reduced to $Cu^0$. The $S^=$ is oxidized to $S$ or to soluble $SO_4$, and other components of the ore precipitate to the bottom of the chamber from which they may be removed for subsequent treatment or disposal. Hence, it is seen that when copper ores are treated in accordance with the present invention, the electrolytic separation of the copper from the ore occurs simultaneously with the anodic treatment in the presence of cuprous halide complex.

According to the present invention a conventional electrolysis tank may be employed comprising two compartments which will preferably be separated by an ion-permeable membrane, such as a ceramic wall. In a preferred form this will constitute three compartments separated by two ion-permeable membranes and comprising a central anode compartment with a cathode compartment on each side.

In order to insure a high concentration of copper ions in the cathode compartment it may be desirable to augment the copper ion transfer from the anode compartment to the cathode compartment. This may be done by withdrawing a portion of the pregnant anode solution containing dissolved copper, filtering it and supplying it to the cathode compartment. In certain cases this will increase the efficiency of the method. In addition this yields an important advantage in that it suppresses hydrogen evolution at the cathode.

In a most preferred embodiment of the present invention a current of 45 amperes per square foot of anode area has been found to yield high efficiency of operation, particularly when coupled with a high ore density.

EXAMPLE 1

A sample of copper concentrate containing copper sulfide and obtained by oil flotation of chalcopyrite copper ore was placed in the anode cup in an apparatus generally as defined in the drawing. Approximately one pound of concentrate was added along with approximately 500 ml., of cuprous chloride complex solution which contained 25 grams of cuprous chloride, and 210 grams of HCl dissolved in water. The cathode compartment was then filled with a solution of HCl which contained 500 grams HCl in 5 liters of water. The current was then turned on and adjusted until a current density of 10 amperes per square foot of anode was obtained. The reaction proceeded with the deposition of copper upon the cathode cylinder. Approximately 75 grams of copper was obtained from the one pound sample of concentrate which initially contained 100 grams of copper. Elemental sulfur was also recovered from the sludge remaining in the anode compartment.

EXAMPLE 2

The method of Example 1 was carried out in much the same manner with the exception that approximately 500 ml. of cuprous bromide complex solution was used which contained 40 g. of cuprous bromide and 480 g. of HBr dissolved in water, and hydrobromic acid were employed. Similar results were encountered. Since the bromides are more expensive than the chlorides, the raw material costs were found to be higher and accordingly this embodiment was less attractive economically.

The above descriptions and specific examples clearly indicate that metal containing ores may be advantageously treated in accordance with the present invention.

I claim:

1. A method of solubilizing copper metal from its ores comprising the step of electrolyzing a slurry of the finely ground ore, in the presence of a catalyst, in the anodic chamber of an electrolytic cell, and electrodepositing copper in the cathode compartment, said catalyst comprising an ion complex of cuprous halide in aqueous hydrogen halide, said hydrogen halide being present in sufficient concentration to induce the complex formation and dissolve copper halide, said halides being selected from the group consisting of chloride, bromide and iodide.

2. A method as in claim 1 wherein the same halide is employed in the copper halide and the hydrogen halide.

3. A method as in claim 2 wherein the cuprous halide is cuprous halide is cuprous chloride.

4. A method as in claim 3 wherein the concentration of hydrogen chloride in the cuprous chloride complex solution is at least 3 N.

5. A method as in claim 4, wherein said complex solution contains from about 0.1 to about 0.6 mole of cuprous chloride and from about 3 to about 6 moles HCl per liter of solution.

6. The method of claim 5 wherein said electrolysis treatment comprises placing said cuprous chloride complex solution in an anodic zone defined by an anode and a membrane permeable to the passage of copper ions, contacting the membrane of the anodic zone with the electrolyte of a cathodic zone defined by a cathode, and an electrolytic solution comprising a solution of hydrogen chloride, and applying a voltage potential across the electrolytic cell.

7. The method of claim 6 for the treatment of sulfide ores and comprising oxidizing copper sulfide to form copper ions, passing said copper ions through said ion-permeable membrane and electrodepositing metallic copper on the cathode.

8. The method of claim 7 wherein said ion-permeable anodic membrane comprises a ceramic membrane.

9. A method as in claim 5 wherein at least part of the transfer of dissolved copper from the anode compartment to the cathode compartment is effected by transfer of anode solution containing dissolved copper.

10. The method of claim 3 wherein said electrolysis treatment comprises placing said cuprous chloride complex solution in an anodic zone defined by an anode and a membrane permeable to the passage of copper ions, contacting the membrane of the anodic zone with the electrolyte of a cathodic zone defined by a cathode, and an electrolytic solution comprising a solution of the corresponding hydrogen chloride, and applying a voltage potential across the electrolytic cell, while agitating the contents of said anodic zone.

11. The method of claim 10 for the treatment of sulfide ores and comprising oxidizing copper sulfide to form copper ions, passing said copper through said ion-permeable membrane and electrodepositing metallic copper on the cathode.

12. An electrolytic solution for extraction of copper metal from its ores, comprising an ion complex of 0.1–0.6 mole per liter cuprous chloride in an aqueous solution containing 3–6 moles per liter hydrogen chloride, said hydrogen chloride being present in sufficient concentration to induce the complex formation and dissolve the cuprous chloride.

References Cited
UNITED STATES PATENTS

| | | | |
|---|---|---|---|
| 1,892,051 | 12/1932 | Gray | 204—52 R |
| 1,011,459 | 12/1911 | MacKay | 204—107 |
| 1,094,371 | 4/1914 | MacKay | 204—107 |
| 664,537 | 12/1900 | Douglas | 204—107 |

FOREIGN PATENTS

| | | | |
|---|---|---|---|
| 882,481 | 6/1943 | France | 204—107 |

JOHN H. MACK, Primary Examiner

R. L. ANDREWS, Assistant Examiner

U.S. Cl. X.R.

106—1